United States Patent

[11] 3,580,343

| [72] | Inventors | Dean M. Hogue<br>West Sacramento (10569 Dolcetto Drive, Rancho Cordova, Calif. 95670);<br>Carl M. Bender, 6007 Mack Road, Sacramento, Calif. 95823 |
|---|---|---|
| [21] | Appl. No. | 768,787 |
| [22] | Filed | Oct. 18, 1968 |
| [45] | Patented | May 25, 1971 |

[54] TRUCK WITH BUILT-IN WEIGHING MECHANISM AND LOAD HOLD-DOWN DEVICE
7 Claims, 21 Drawing Figs.

[52] U.S. Cl. .................................................. 177/136,
177/154, 280/106.5
[51] Int. Cl. .................................................. G01g 19/08,
G01g 23/02
[50] Field of Search .......................................... 177/136,
154—158; 296/35, (Inquired); 280/106.5,
(Inquired)

[56] References Cited
UNITED STATES PATENTS

| 654,329 | 7/1900 | Schneider.................... | 177/136 |
| 704,946 | 7/1902 | Sohn ............................ | 177/154X |
| 2,088,354 | 7/1937 | Ward............................ | 177/154X |
| 2,314,552 | 3/1943 | Orr............................... | 177/154X |
| 2,875,591 | 3/1959 | Girton et al.................. | 177/157X |
| 3,299,977 | 1/1967 | Melendy....................... | 177/158 |
| 3,420,325 | 1/1969 | McAlister et al. ............ | 177/154X |

Primary Examiner—Richard B. Wilkinson
Assistant Examiner—George H. Miller, Jr.
Attorney—Alexander B. Blair

ABSTRACT: A truck chassis frame is provided with means for supporting a truck body thereabove, which means is utilized for operating a mechanism connected to a scale for weighing the body of the truck and the contents thereof. Before the truck operates in transit, the operator puts into operation means for fixing the truck body with respect to the chassis frame to prevent any movement of the truck body relative to the chassis frame during transit.

INVENTORS.
DEAN M. HOGUE
BY CARL M. BENDER

Alexander B. Blair
ATTORNEY.

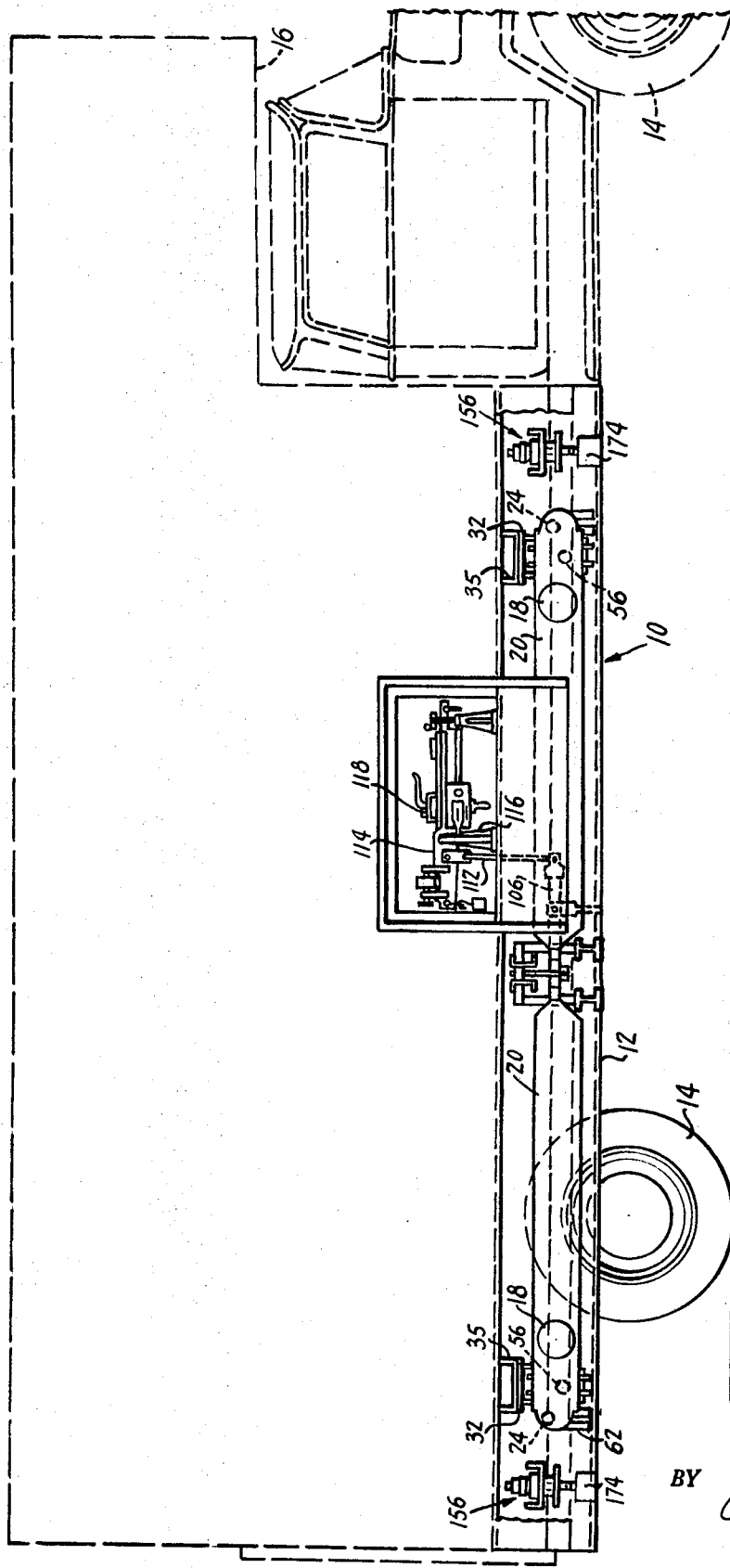

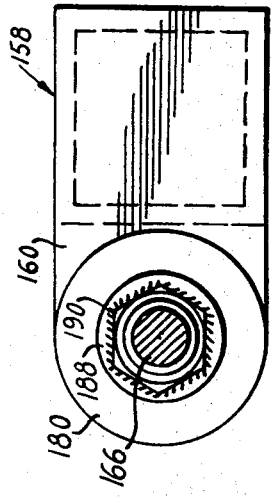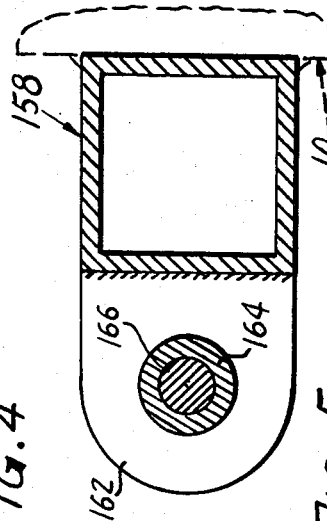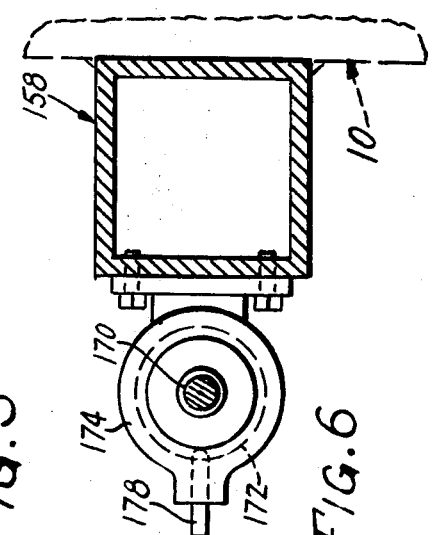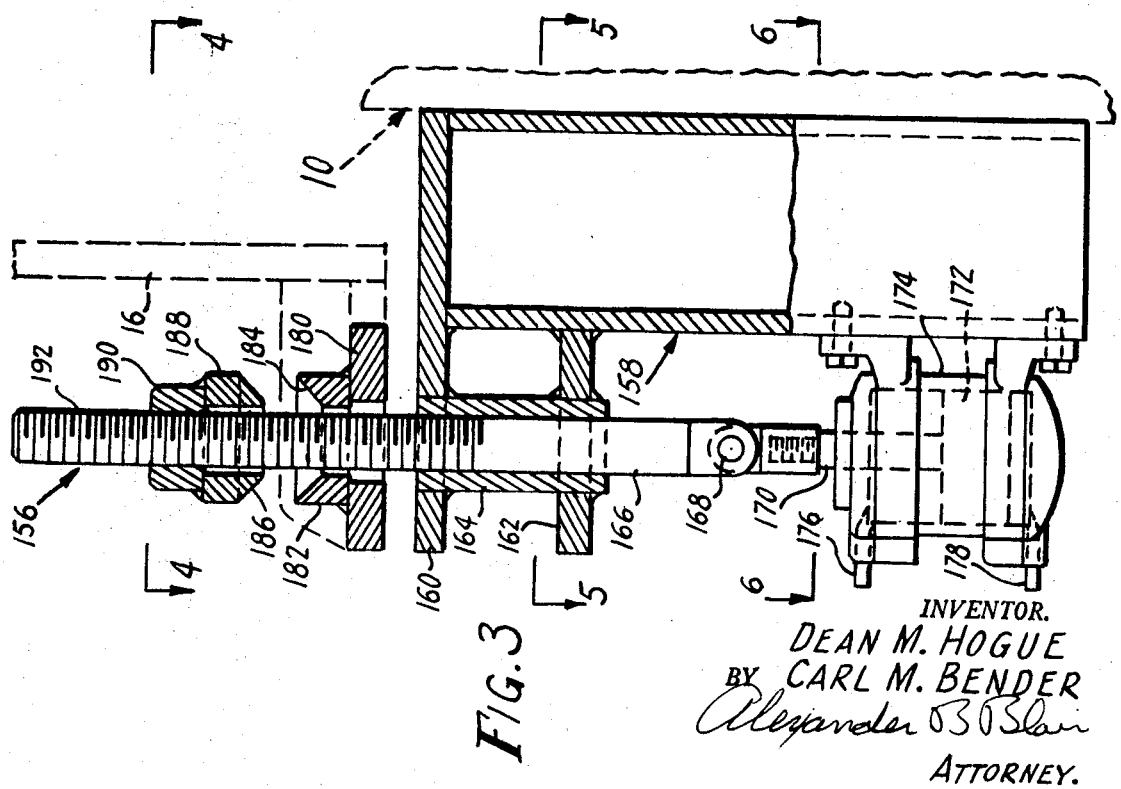

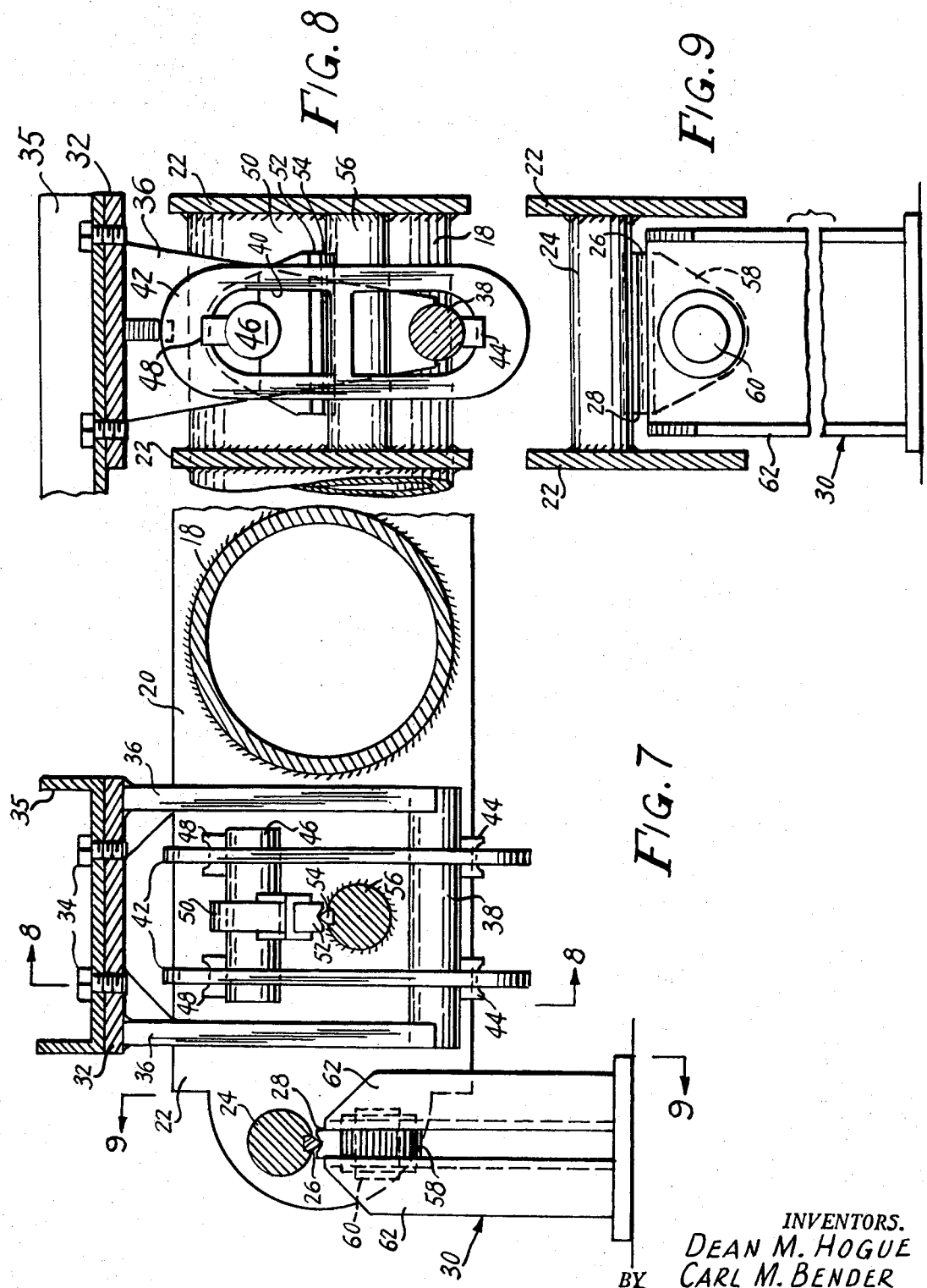

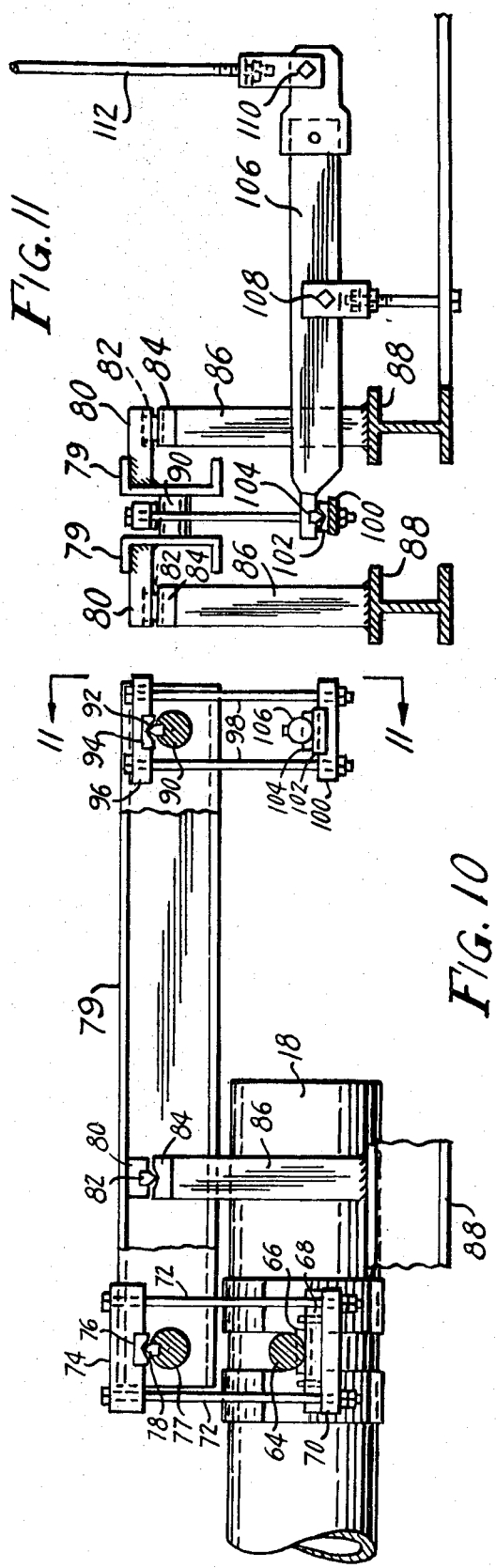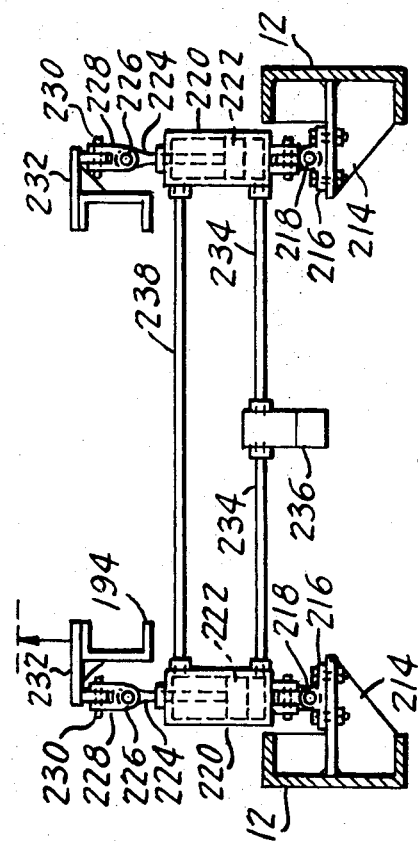

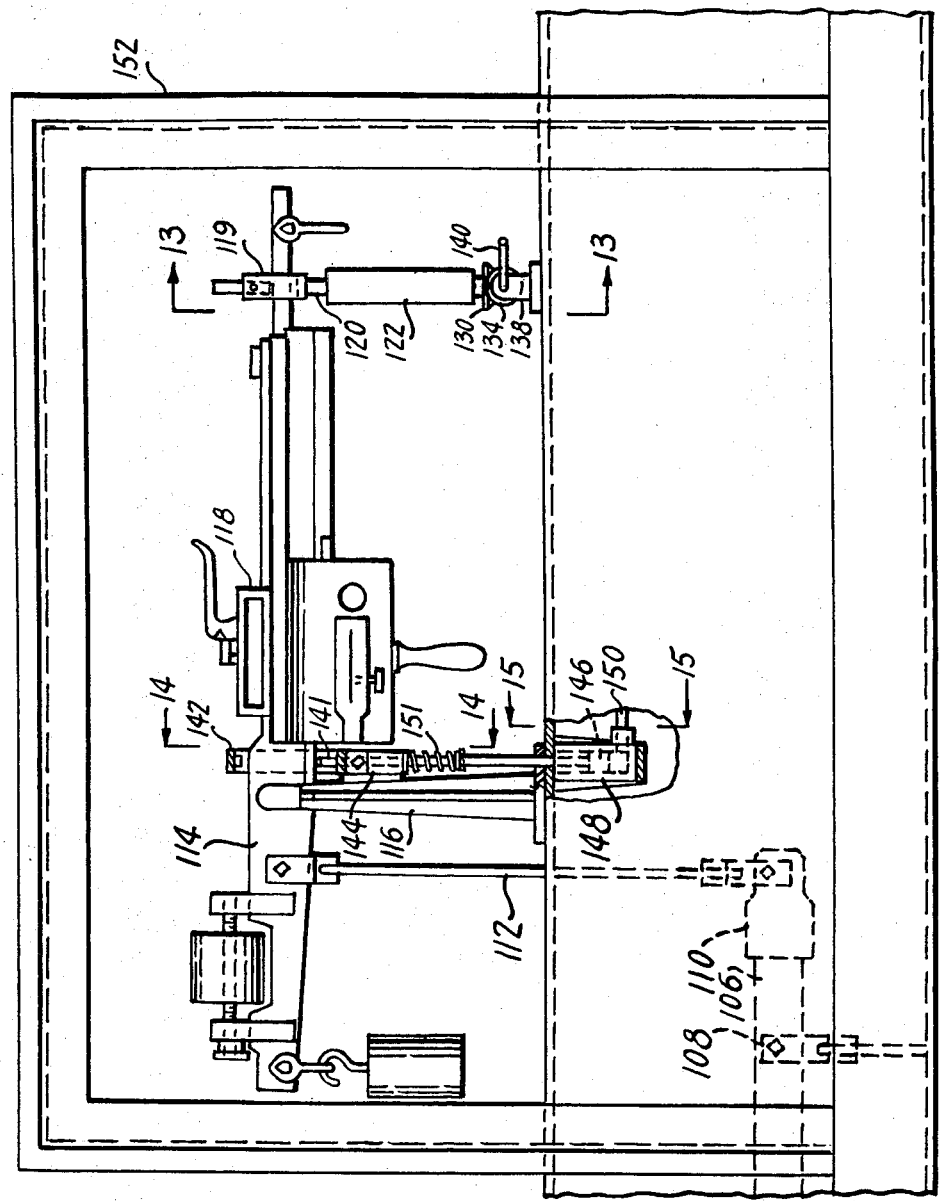

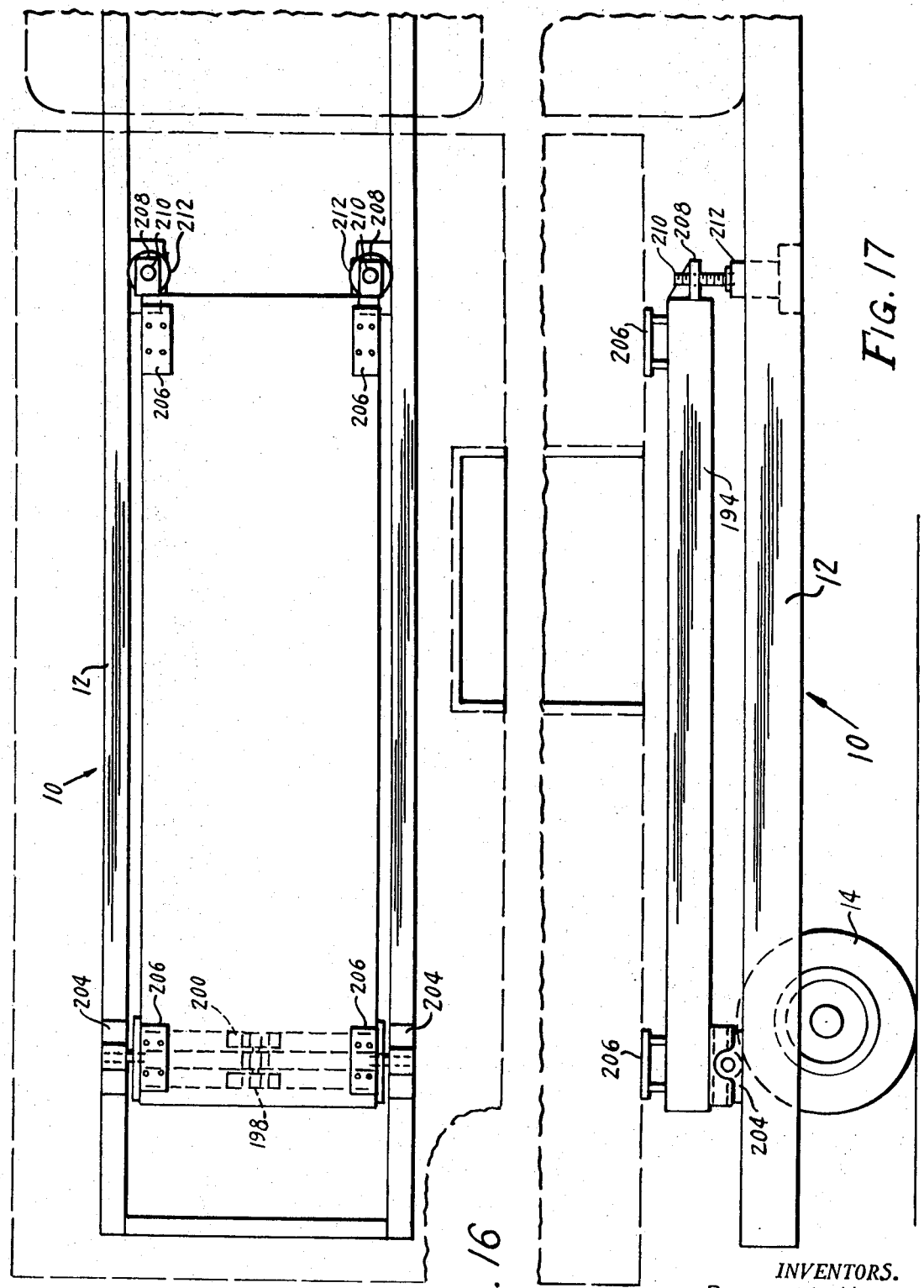

PATENTED MAY 25 1971

INVENTORS.
DEAN M. HOGUE
BY CARL M. BENDER
Alexander B Blair
ATTORNEY.

3,580,343

TRUCK WITH BUILT-IN WEIGHING MECHANISM AND LOAD HOLD-DOWN DEVICE

BACKGROUND OF THE INVENTION

It is the common practice, for example, in the use of moving vans, to weigh a truck while unloaded, then loading furniture or other wares thereon, and then to drive the truck to a weighing station to weight the total load so that the weight of the contents of the truck can be determined for the fixing of freight rates.

SUMMARY OF THE INVENTION

In a preferred embodiment of the invention two lever mechanisms are employed, spaced forwardly and rearwardly and supported by the truck chassis frame. Each lever mechanism comprises a transverse beam, each having lever arms connected thereto and projecting toward each other with the adjacent ends of the lever arms connecting to lever mechanism for transmitting force to a scale beam to weigh the truck body and the contents thereof. A pair of short lever arms is connected to each transverse beam and are pivotally supported with respect to the truck chassis frame so that the transverse beams and the first named lever arms are free to swing relative to the chassis frame.

Transversely aligned pairs of supports, commonly known as "girder chairs" are arranged beneath and support the truck body relative to the lever mechanism. A double linkage suspension mechanism connects each girder chair to its associated lever mechanism so that as the truck is loaded, force is applied to the lever mechanisms to effect movement of the scale beam. The double links suspension feature permits the truck body to "float" relative to the chassis frame. It is highly undesirable to drive the truck under such conditions. The present invention, therefore, contemplates the provision of means for anchoring the truck body to the chassis frame to fix it relative to the chassis frame to provide for the safe transit of the truck and the contents thereof.

Any type of force applying means, for example, solenoids, may be employed for anchoring the truck body during transit. I prefer, however, to employ as the power means hydraulic pistons and cylinders connected between the truck body and the chassis frame and energizable after after the truck has been loaded and the contents weighted to fix the truck body in position relative to the chassis frame.

In a modified form of the invention, an auxiliary frame is arranged above and supported with respect to the chassis frame with the truck body arranged over the auxiliary frame and supported with respect thereto by the means described above so that the load will be transmitted to the weighing mechanism for weighing the contents of the truck. In the modified form, the auxiliary frame is pivotally supported at one end relative to the truck frame for universal turning movement, the other end of the auxiliary frame being provided with leveling means to permit the auxiliary frame and hence the truck body to be accurately leveled when it is desired to weight the contents of the truck body.

BRIEF DESCRIPTION OF THE DRAWINGS

FIG. 2 is a side elevation of the same, parts of the truck frame being broken away;

FIG. 3 is an enlarged fragmentary sectional view on line 3–3 of FIG. 1;

FIG. 4 is a similar view on line 4–4 of FIG. 3;

FIG. 5 is a similar view on line 5–5 of FIG. 3;

FIG. 6 is a similar view on line 6–6 of FIG. 3;

FIG. 7 is an enlarged sectional view on line 7–7 of FIG. 1;

FIG. 8 is a section on line 8–8 of FIG. 7;

FIG. 9 is a section on line 9–9 of FIG. 7;

FIG. 10 is an enlarged transverse sectional view on line 10–10 of FIG. 1;

FIG. 11 is a section on line 11–11 of FIG. 10;

FIG. 12 is an enlarged face view of the scale mechanism and its surrounding casing, built within, but not contacting, a cavity provided in the side of the truck body;

FIG. 13 is a detail section on line 13–13 of FIG. 12;

FIG. 14 is a similar view on line 14–14 of FIG. 12;

FIG. 15 is a detail section on line 15–15 of FIG. 12;

FIG. 16 is a plan view of a modified form of the invention;

FIG. 17 is a side elevation of the same;

FIG. 21 is a detail transverse sectional view showing the means for holding the auxiliary frame in fixed position after it has been leveled.

DESCRIPTION OF THE PREFERRED EMBODIMENTS

Figure 1:
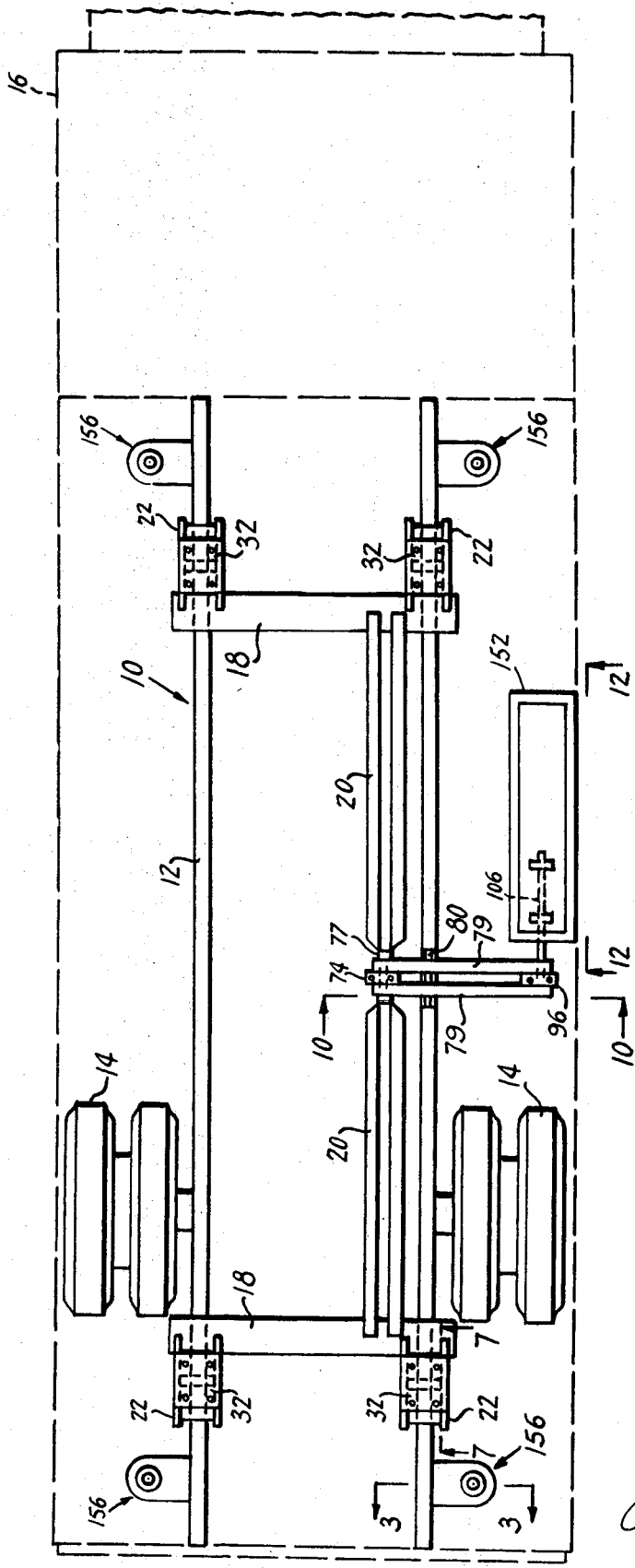
FIG. 1 is a plan view of the chassis frame and associated elements, the truck being removed.
Figure 20:
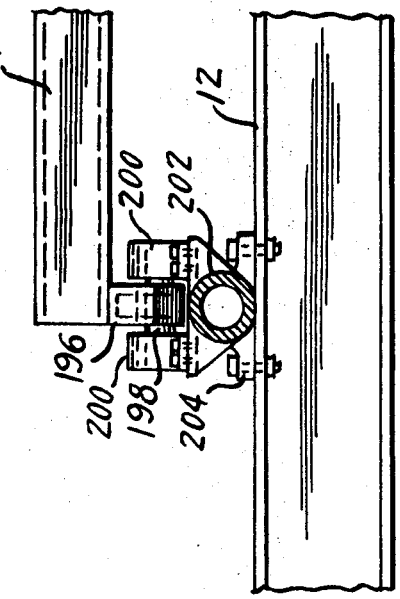
FIG. 20 is a similar view on line 20–20 of FIG. 19.
Figure 18:
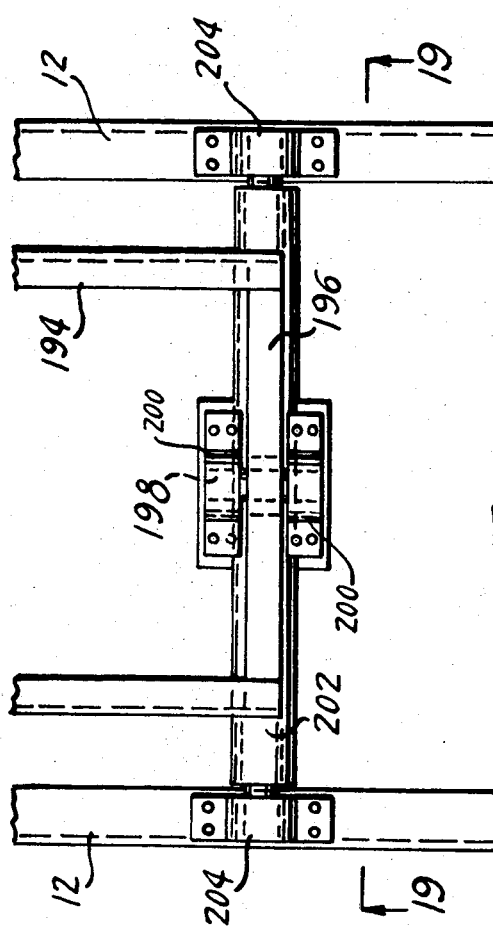
FIG. 18 is an enlarged fragmentary plan view of a portion of the modified form of the invention.
Figure 19:
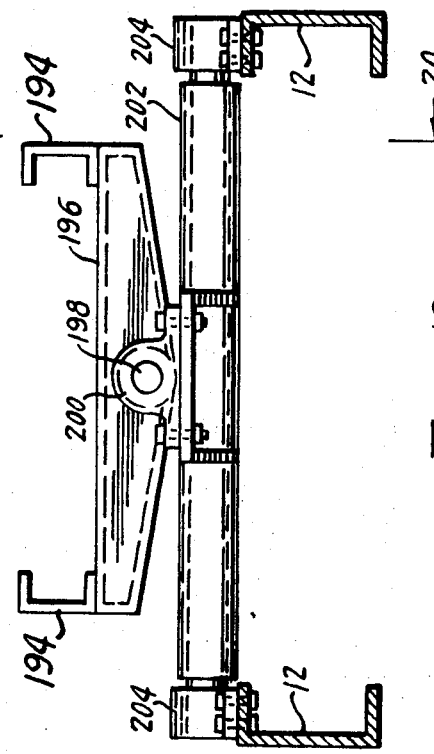
FIG. 19 is a section on line 19–19 of FIG. 18.

Referring to FIGS. 1 and 2 the numeral 10 designates a truck as a whole having the usual chassis frame 12 and supporting wheels 14. The truck includes a body 16 shown in the present instance as being of the van type. A pair of transverse beams 18, shown in the present instance as being tubular, extend across the chassis body at points spaced from the forward and rear ends thereof. Each of these beams carries a lever arm 20, and these arms extend toward each other to operate a scale mechanism as described below.

Each beam 18 is provided adjacent each end thereof with a pair of lever arms 22 (FIGS. 1, 8 and 9) and the arms 22 of the two beams 18 project away from the associated lever arm 20. The lever arms 22 of the two beams 18 are identical with each other and only one need be described in detail. Referring to FIGS. 7, 8 and 9, it will be seen that the lever arms 22 of each pair are connected by a transverse rod 24 carrying at the bottom thereof a knife edge 26 engageable with a bearing 28 carried by a vertical stand 30 fixed at its lower end to the adjacent chassis frame member. Accordingly, the lever arms 22, beams 18 and long lever arms 20 are adapted to swing about the axis of the points of engagement of the knife edges 26 with their bearings 28. Arranged above the lever arms 22 of each pair is arranged a "girder chair" 32. These elements provide supporting means for the truck body and to this end, they are fixed as at 34 to a beam or girder 35 attached to the bottom of the truck body and extending thereacross. There will be one of these girders, of course, adjacent each end of the truck body, and there will be four of the girder chairs 32 as shown in FIG. 1.

Each girder chair 32 (FIGS. 7, 8 and 9) is provided with a depending yoke 36 rigidly connected thereto. The yoke 36 includes a lower transverse rod 38 arranged within openings 40 in vertically elongated links 42 spaced from and parallel to each other as shown in FIG. 7. Each rod 36 rests on a saddle 44 carried by the links 42. A relatively short rod 46 is arranged within the openings 40 of each pair of links 42 and engages adjacent its ends and at the top thereof with saddles 48 engaging the tops of the openings 40. The rod 46 carries a preferably integral support 50 as shown in FIGS. 7 and 8 and this support is slotted in the bottom thereof to receive a knife-edge bearing 52 engaged by a knife edge 54 carried by a transverse rod 56 fixed at its ends to the two short lever arms 22 of each lever mechanism. Thus it will be seen that each girder chair 32 is supported by its yoke 36, the rod 38 of which is supported by the saddles 44 carried by the links 42. These links in turn are supported by the saddles 48 and rod 46 and this rod in turn is supported through the knife edge 54 by the transverse rod 56 carried by the lever arms 22. This constitutes a double link suspension feature which absorbs platform impacts and provides a free floating arrangement of parts, the bearings being maintained in a permanent position on the knife edges. The arrangement keeps the bearings from rubbing or sliding on the knife edges, as will be apparent.

As previously stated, the knife edge 26 (FIG. 7) is supported by the rigid stand 30. To increase the flexibility of the connections of the parts, the bearing 28 is preferably carried by a rocker 58 mounted on a stub shaft 60. The stand 30 is preferably formed of upstanding parallel elements 62 within which the rocker 58 is arranged and by which the stub shaft 60 is supported.

It will be apparent that as the loading of the truck body progressively increases, the increases weight will transmit force through the girder chairs 32 to the lever structures. The knife edges 26 (FIG. 7) serve one very basic purpose, namely, to permit the most efficient transfer of loads accepted by the lever arms 22 to other parts of the lever mechanism after the magnitude of the load is reduced by the ratio of the lever mechanism. The knife edges minimize the drag due to friction, which is necessary even though there is no movement of the levers.

Thus the adjacent free ends of the two lever arms 20 will exert a downward force. These lever arms terminate in reduced ends 64 (FIGS. 1 and 10). These reduced ends 64 rest on saddles 66 carried by blocks 68 supported by crossheads 70. These crossheads are connected by elongated bolts or similar elements 72 to an upper head 74 carrying therebeneath a bearing 76 engaged by a knife edge 78 supported by a rod 77.

Referring to FIGS. 10 and 11, it will be noted that the rod 77 is connected, preferably by welding, at its ends to beam elements 79 arranged parallel to and spaced from each other. At a point spaced from the rod 77, the beams 79 are provided with oppositely projecting arms 80 welded or otherwise secured thereto and provided with knife edges 82 engaging bearings 84 on upstanding supports 86. The lower ends of these arms are supported on out-rigger beams 88 carried by the chassis frame.

The right-hand ends of the beams 79 are connected by a transverse bar 90 (FIGS. 10 and 11) and this bar carries a knife edge 92 engaging a bearing 94 mounted beneath a crosshead 96. This member is connected by depending bolts 98 to a bottom cross head 100 on which is arranged a bearing 102 engaged by a knife edge 104. The knife edge is carried by the inner end of a lever 106 pivotally supported as at 108 connected at is outer ends as at 100 to upwardly projecting scale operating rod 112.

Referring to FIG. 12, the rod 112 is connected at its upper end to a scale beam 114, there being provided a knife edge pivot connection between the rod and the beam (not shown). The beam 114 is supported on a stand 116, preferably by a knife edge pivot (not shown). The scale beam is more or less conventional and need not be described in great detail. In common with scales of oil trucks, for example, the scale mechanism is provided with a beam poise 118 which also preferably furnishes a printed ticket so that a person moving his furniture in the van may be advised as to the exact weight thereof. The free end of the scale beam projects through a trig loop 119 which in itself is more or less conventional. This loop is carried by the upper end of a stem 120, vertically slidable in a sleeve 122 supported by a bracket arm 123. The inside of the steam 120 is threaded as at 126 to receive a threaded stem 128, the lower end of which is provided with a bevel gear 130. The stem 126 is guided relative to the sleeve 122 by a screw 132.

The bevel gear 130 meshes with a similar gear 134 carried by a shaft 136 supported in bearings 138 and provided at its end with a crank arm 140. It will be apparent that the scale beam may be leveled by moving the trig loop 119 upwardly and downwardly by rotating the crank 140.

Referring to FIGS. 12 and 15, it will be noted that an upwardly movable stem 141 is engageable with the scale beam to move it upwardly to a limit of movement in engagement with a stop 142 to hold the beam rigid during transit. The stem 141 is slideable in a bearing 144 and is provided at its lower end with a piston 146 movable in a hydraulic cylinder 148 to which hydraulic fluid may be admitted through a pipe 150. A return spring 151 biases the stem 141 downwardly when the scale is in use.

The scale beam mechanism is preferably housed within a casing 152 which is flush with but does not contact with the side of the truck, to protect it from the whether, and it is preferably provided with a door (not shown) adapted to be locked to prevent the scale from being tampered with.

As previously stated, the girder chairs 32 support the body of the truck and when the latter is loaded, the girder chairs are not positively supported and accordingly a floating connection is established between the body of the truck and the chassis. This is undesirable during the transit of the truck, it being advantageous of course to fix the truck body relative to the chassis frame while the truck is travelling. To this end, the plurality of mechanisms indicated as a whole by the numeral 156 (FIG. 3) is provided as holddown means for the truck body. In practice, one of these devices is provided adjacent each girder chair.

Referring to FIGS. 3, 4, 5 and 6, a support 158 is welded or otherwise fixed to the chassis frame and projects outwardly therefrom adjacent each girder chair. This support includes a pair of laterally extending horizontal plates 160 and 162 through which extends a bearing sleeve 164 welded thereto. This sleeve slidably supports a vertical stem 166 pivotally connected at its lower end as at 168 to a piston rod 170 having at its lower end a piston 172 arranged in a hydraulic cylinder 174. This cylinder is provided at opposite ends with hydraulic inlet pipes 176 and 178 for the admission of hydraulic fluid.

Each stem 166 extends upwardly through a plate 180 fixed to the truck body 16 and on the top of each plate 180 is a sleeve element 182 welded thereto. This element is provided in its upper face with a conical seat 184 engageable by the conical lower end 186 of a thimble 188 usually supported in spaced relation to the member 182 since it is welded or otherwise fixed to a nut 190 threaded on the threaded upper end 192 of the stem 166. After the truck body has been completely loaded, hydraulic fluid is admitted to the upper end of the cylinder 174, thus pulling downwardly on the stem 166 and thimble 188 to engage the latter in the recess 184. This holddown means therefore prevents any upward movement of the truck body under any conditions, as when disassembling the scale or when the vehicle is in transit on very bumpy roads. Obviously, all of the cylinders 174 will have their fluid inlets connected together to operate simultaneously.

A modified form of the invention is shown in FIGS. 16 to 21, inclusive. In this case an auxiliary frame 194 is arranged above the chassis frame 12. At its rear end, the frame 194 has its side members connected by a bolster 196 which carries a heavy pivot pin 198 journaled in bearings 200 carried by a transverse member 202 journaled at its end in bearings 204 carried by the chassis frame 12. The auxiliary frame is provided with girder chairs 206 (FIG. 16) arranged substantially the same as the girder chairs 32 previously described and adapted to support the truck body.

At their forward ends, the auxiliary frame members 194 are provided with brackets 208 in which are threaded stems 210, the lower ends of which are adapted to be rotated by electric motors 212 carried by the chassis frame. These motors are reversible and are adapted to be operated to move one side or the other of the auxiliary frame upwardly or downwardly or to move one side upwardly and the other downwardly, to level the auxiliary frame for the purpose of rendering this scale accurate in operation. It will be apparent that the axis of the shaft 198 and the journaled ends of the member 202 (FIG. 19) provide a universal mounting support for the auxiliary frame.

It will be apparent that since the rear end of the auxiliary frame has a single point support, there will be a tendency for lateral tipping of the truck body above the single support when the vehicle is in transit. Hence, it is desirable to provide means such as that shown in FIG. 21 for positively limiting any transverse tilting movement of the auxiliary frame 194. To this end the chassis frame members 12 are provided with brackets 214 supporting bearings 216 each carrying a pivot pin 218 pivotally supporting the lower end of a hydraulic cylinder 220. One of these hydraulic cylinders will be arranged at each side of the truck, as clearly shown in FIG. 21. Each hydraulic cylinder 220 is provided with a piston 222, the piston rod 224 of which is pivotally connected at its upper end as at 226 to a universal bearing device 228, a transverse pin 230 at the upper end of such device pivoting it to a bracket 232 carried by each auxiliary frame member 134.

The lower ends of the cylinders 220 are provided with hydraulic pipes 234 between the ends of which is arranged a solenoid valve 236 which, when closed, prevents the flow of fluid between pipes 234. The upper ends of the cylinders 220 are connected directly by a pipe 238 as shown in FIG. 21. It will be apparent that when the solenoid valve 236 is open, fluid is free to flow around the closed circuit provided by the pipes 234 and 238 and cylinders 220. Thus the motors 212 (FIG. 17) may be operated to level the auxiliary frame 194. While travelling, however, the solenoid valve 236 will be closed, and the incompressibility of the hydraulic fluid in the closed circuit will fix the pistons 222 against any vertical movement and the frame 194 will be positively locked against movement.

Certain elements of the mechanism have been omitted from FIGS. 16 to 21, inclusive. For example, it will be understood that the girder chairs 206 will be connected to means for transmitting force to the scale in the same manner as in the first described form of the invention. Moreover, the holddown means for holding the truck body against upward movement also will be provided, and such means has been omitted from the showing of the modified form of the invention.

The holddown or lockout devices serve two functions. They control lateral movement of the truck body and load, permitting shifting as gravity may require to achieve correct balance, but they prevent excessive lateral movement which might damage the scale or render it unfit to weigh accurately. In the second place, they provide an artificial downward force upon the vehicle body to counteract any vertical force tending to separate the several parts of the scale, as when the vehicle is travelling over a bumpy road or rough terrain. The actuating devices for the holddown means may be of any desired type, for example, hydraulic cylinders, as shown, air cylinders, electric solenoids, etc. Each such device exerts a positive downward force when the scale is locked and releases such force when the scale is in readiness for weighing. These devices are mounted on the frame brackets 158, as shown. Where fluid cylinders 174 are employed, the fluid will be supplied both to the top and bottom of the cylinder to effect positive upward or downward force of each piston 172. Each shaft guide 164 (FIG. 3) supports its associated shaft for vertical movement and transmits any lateral force on the shaft to the stationary frame of the chassis.

Various elements of the apparatus will be interconnected with the ignition switch. For example, the valve mechanism (not shown) for admitting fluid pressure to the upper ends of the cylinders 174 must be operated to hold the pistons 172 at their downward limit of movement before the ignition switch can be turned on to start the vehicle ignition. The same is true of the scale fixing means (FIG. 12), it being necessary to admit fluid pressure to the bottom of the cylinder 148 to anchor the scale beam against movement before the vehicle engine can be started.

From the foregoing it will now be seen that there is herein provided an improved truck with built-in weighing mechanism which accomplishes all of the objects of this invention and others, including many advantages of great practical utility and commercial importance.

As various embodiments may be made of this inventive concept, and as many modifications may be made in the embodiments hereinafter shown and described, it is to be understood that all matter herein is to be interpreted merely as illustrative, and not in a limiting sense.

We claim:

1. In a truck of the type described, a truck chassis frame, a plurality of transversely and longitudinally spaced seat means arranged above the chassis frame and on which the truck body is supported, a scale, force transmitting means between all of said seat means and said scale whereby downward forces on said seat means incident to increased loading of the truck will be registered on the scale, and means for fixing said truck body against upward movement relative to said chassis frame with said last named means comprising a plurality of motors at each side of said chassis frame at longitudinally spaced points therealong and fixed thereto, each motor having an upwardly extending power operated element, a steam projecting upwardly from each such element, and means for transmitting force from the upper end of each stem to the truck body to prevent upward movement thereof relative to said chassis frame.

2. Apparatus according to claim 1 provided with a plurality of frame brackets fixed against the outer faces of the chassis frame at longitudinally spaced points therealong, each motor being fixed to one of said bracket, each bracket having a vertically elongated guide through which said stems project for transmitting lateral forces to the chassis frame.

3. Apparatus according to claim 1 wherein said last named means comprises a plurality of body brackets carried by said truck body and projecting laterally therefrom at longitudinally spaced points, and means for transmitting downward forces from said motors to said body brackets to fix said body against upward movement relative to said chassis frame.

4. Apparatus according to claim 3 provided with a plurality of frame brackets secured at spaced points along opposite sides of and to said chassis frame, each motor being secured to one of said frame brackets.

5. Apparatus according to claim 4 wherein each frame bracket is provided with vertically spaced rigid plates projecting outwardly from said chassis frame, and a sleeve fixed to each pair of said plates and through which one of said stems is vertically slidable.

6. In a truck of the type described, a truck chassis frame, a plurality of transversely and longitudinally spaced seat means carried by said chassis frame, a truck body resting on said sheet means, scale means carried by said truck body and including a scale beam mounted to pivot on a horizontal axis, force transmitting means connected between all of said seat means and said scale beam whereby the weight of said truck body and the contents thereof will exert a force on said seat means and move said scale beam, and force applying means for preventing upward movement of the truck body relative to said chassis frame, said last named means comprises a plurality of motors at each side of said chassis frame, each motor being adjacent one of said seat means and fixed to said chassis frame, each motor having an upwardly extending power operated element, a stem projecting upwardly from each such element, and means for transmitting force from the upper end of each stem to said truck body to prevent upward movement thereof.

7. Apparatus according to claim 6 provide with stop means engageable with said scale beam to prevent one end thereof from swinging beyond a predetermined point, and a fluid pressure piston and cylinder means for transmitting movement to said scale beam to hold it at said predetermined point.